United States Patent [19]

Brown et al.

[11] 4,091,889

[45] May 30, 1978

[54] CREEPER - DEADMAN

[75] Inventors: Vaikai K. Brown, Thompson; Richard N. Fatur, Eastlake, both of Ohio

[73] Assignee: Towmotor Corporation, Mentor, Ohio

[21] Appl. No.: 760,064

[22] Filed: Jan. 17, 1977

[51] Int. Cl.² ............................................. B60K 23/00
[52] U.S. Cl. ................................. 180/101; 180/82 A; 74/474
[58] Field of Search .................. 180/101, 82 A, 66 R, 180/53 CD; 60/421, 487, 488, 433; 200/61.88, 61.91; 74/474

[56] References Cited

U.S. PATENT DOCUMENTS

| | | | |
|---|---|---|---|
| 1,288,906 | 12/1918 | Jensen | 180/101 |
| 3,005,562 | 10/1961 | Shaffer | 60/421 X |
| 3,334,488 | 8/1967 | Lauck | 180/101 X |
| 3,451,218 | 6/1969 | Grant | 60/487 |
| 3,486,335 | 12/1969 | Kern | 60/488 |
| 3,700,062 | 10/1972 | Garnett | 180/101 |
| 3,930,555 | 1/1976 | Iijima | 180/82 A |

FOREIGN PATENT DOCUMENTS 923,856    4/1963    United Kingdom ........... 180/53 CD Primary Examiner—Joseph F. Peters, Jr.
Assistant Examiner—Terrance L. Siemens
Attorney, Agent, or Firm—Phillips, Moore, Weissenberger, Lempio & Majestic

[57] ABSTRACT

A combined creeper and safety control system for an industrial lift truck or the like includes a transmission override or creep control valve normally biased to a disabling position with means for selectively connecting the creeper control valve member to be operated by the operator and including a control system responsive to the presence of an operator on the vehicle seat for activating the control circuit whereby the control valve may be connected to the transmission creeper and disabling control member for thereby providing operator control of the transmission. The control system operates automatically upon the absence of the operator on the vehicle seat to automatically disengage the control member from the creeper valve thereby permitting the valve to be biased automatically to its disabling position.

14 Claims, 7 Drawing Figures

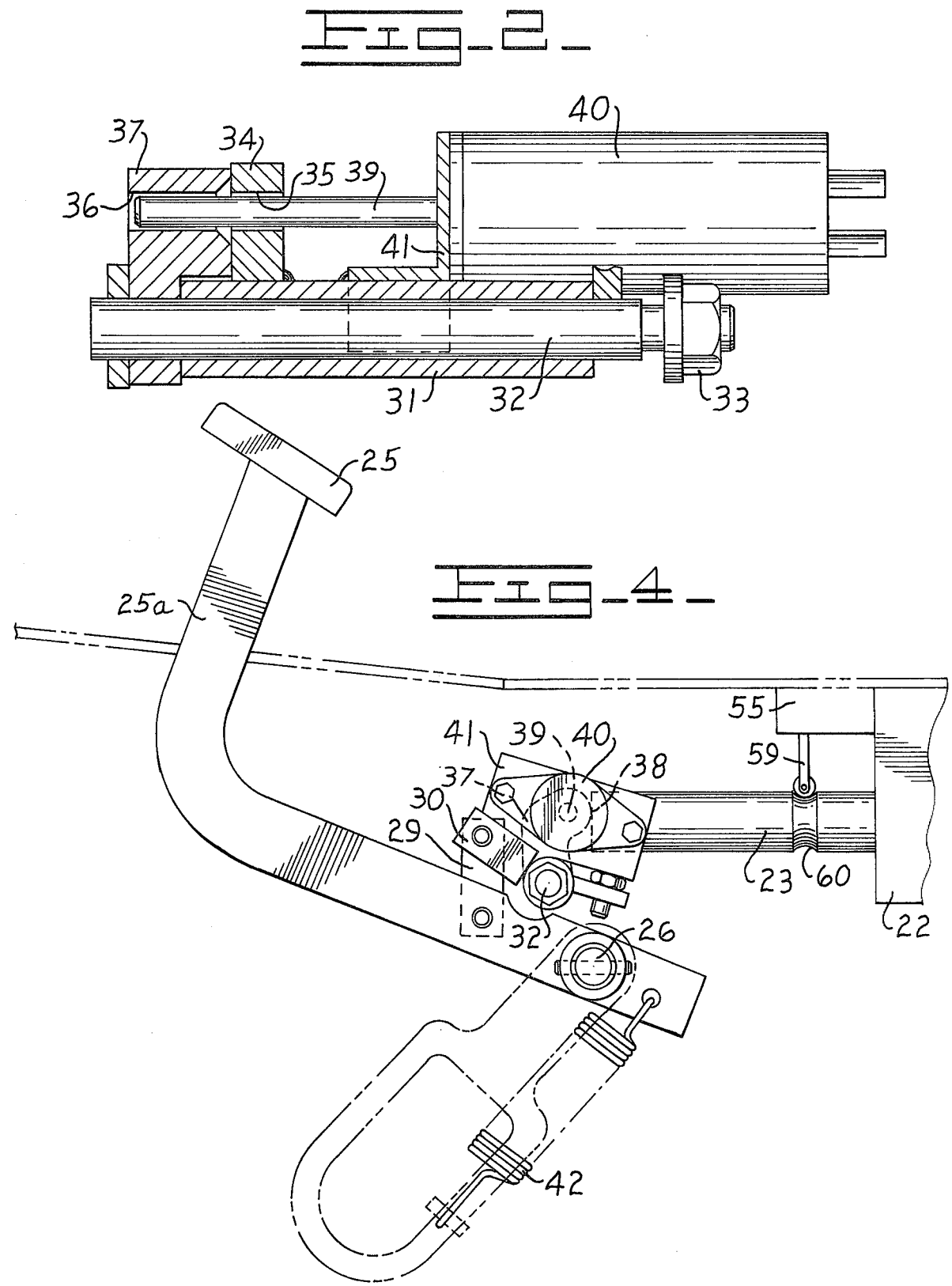

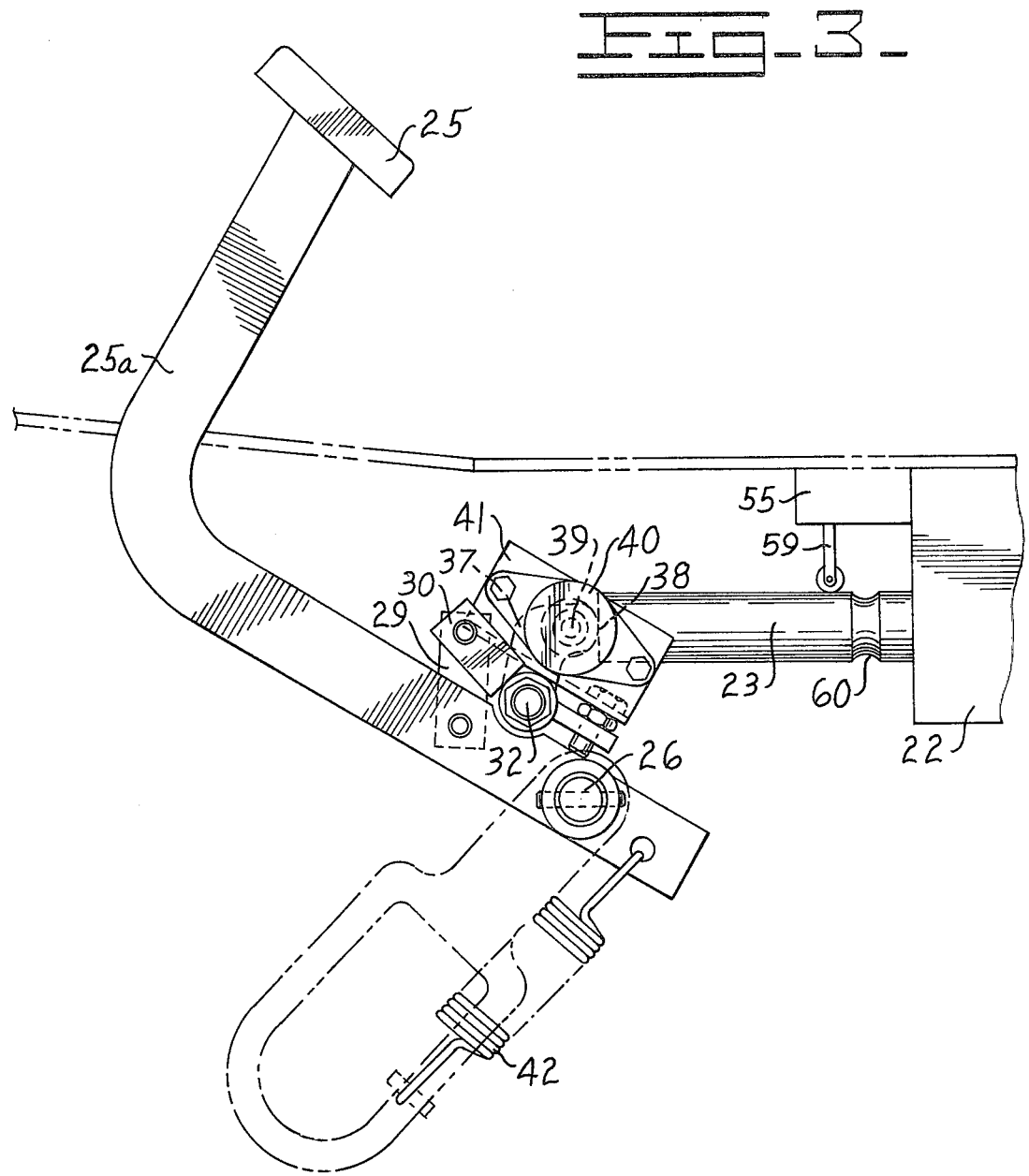

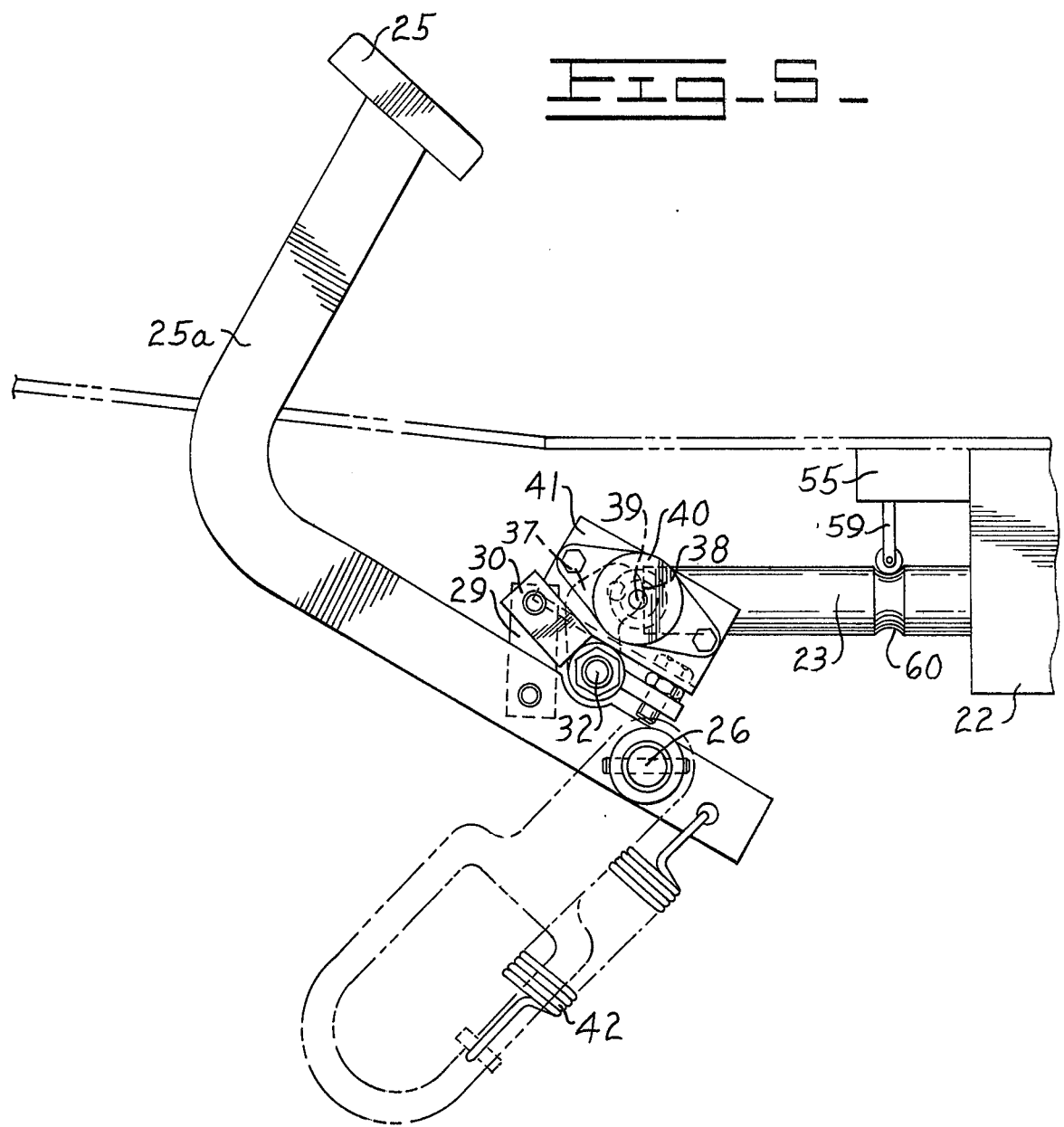

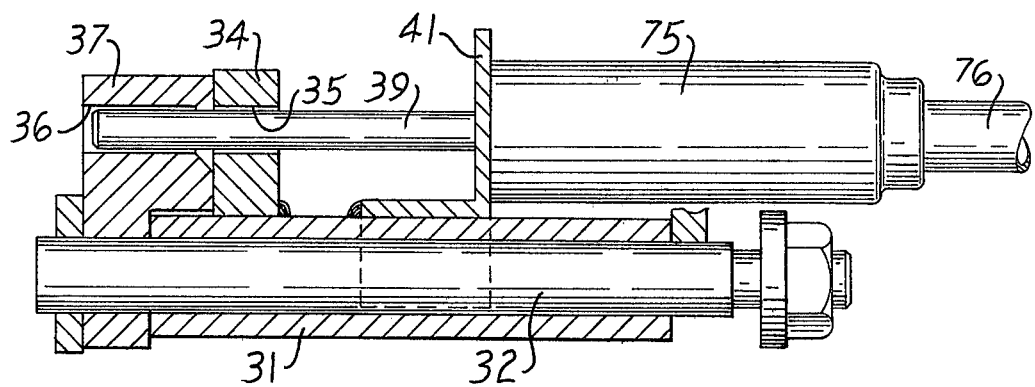
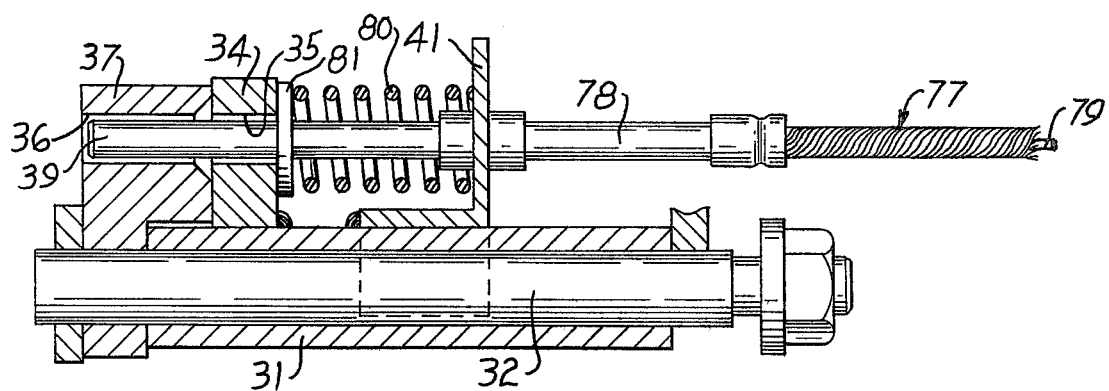

CREEPER - DEADMAN

BACKGROUND OF THE INVENTION

The present invention relates to control systems and pertains particularly to combined safety and creeper control systems for industrial vehicles.

Many industrial trucks, such as lift trucks and the like, are powered by gasoline engines and include a hydrostatic transmission for transmitting power from the engine of the vehicle to the driving wheels thereof. The hydrostatic transmission employs a hysrostatic motor and pump, and is controlled by varying the displacement of one or the other, or both of the motor and pump to achieve forward and reverse of the vehicle and to control the speed thereof.

Because of the limit on the number of manual control members that an operator can successfully manipulate for control of the vehicle, many functions of the vehicle are combined to single manual control members. For example, the drive and transmission control are normally combined in a single element. While the control system is normally such that the transmission automatically goes to neutral when the throttle control is released to permit the engine to idle, this may not always be the case. For this reason, it is desirable to insure that the transmission is disabled when the vehicle operator leaves the vehicle. Failure to do so may result in the vehicle moving under its own power without the operator present. For this reason it is desirable to have automatic disabling means which automatically disable the vehicle when the operator leaves the seat of the vehicle.

SUMMARY AND OBJECTS OF THE INVENTION

It is therefore the primary object of the present invention to provide a control arrangement for industrial vehicles and the like, that overcomes the above problems of the prior art.

Another object of the present invention is to provide a vehicle control arrangement that is simple and effective to automatically disable a vehicle upon removal of the operator therefrom.

A further object of the present invention is to provide a control arrangement for a vehicle having safety lockout means which is responsive to automatically disable the vehicle in the absence of an operator thereon and to require the presence of the operator and specific acts of reactivation of the control system prior to enabling the vehicle to operate.

In accordance with the primary aspect of the present invention, a control arrangement for a vehicle includes a creeper control valve biased to a position for automatically disabling the transmission of a vehicle upon the absence of an operator therefrom and responsive to the presence of the vehicle operator on the seat thereof to permit a reactivation of the transmission control means to enable the vehicle to be operated.

BRIEF DESCRIPTION OF THE DRAWINGS

The above and other objects and advantages of the present invention will become apparent from the following description when read in conjunction with the accompanying drawings, wherein:

FIG. 2 is a detailed view partially in section of a portion of the system of FIG. 1;

FIG. 3 is a side-elevational view of a portion of the system of FIG. 1 showing the operator control pedal and system interconnected and in the enabling position;

FIG. 4. is a view like FIG. 3 with the control pedal positioned to be connected;

FIG. 5 is a view like FIG. 3 of the system shown in the disabled position;

FIG. 6 is a view like FIG. 2 of an alternate embodiment; and,

FIG. 7 is a view like FIG. 6 of still another embodiment.

DETAILED DESCRIPTION

Figure 1:
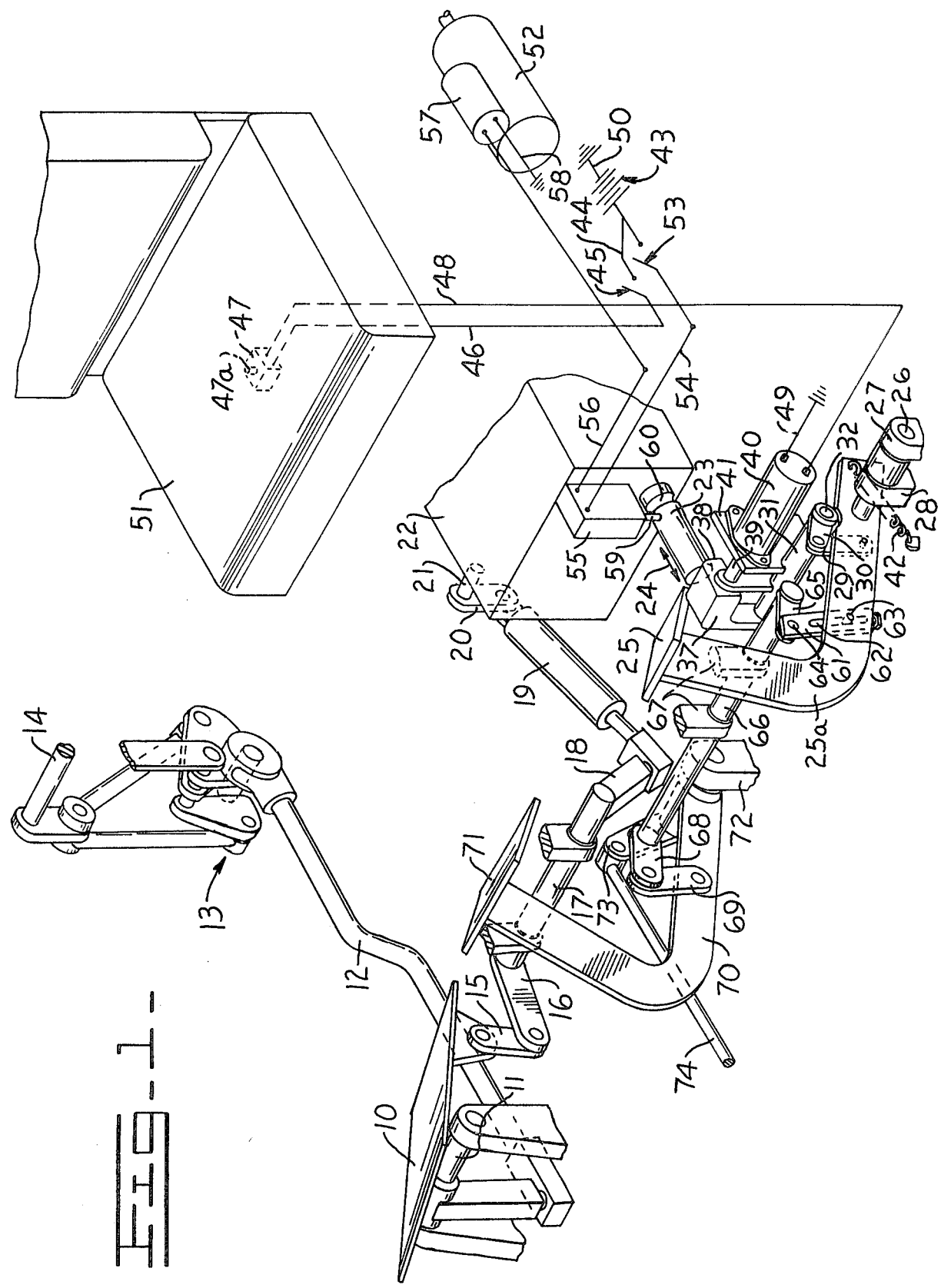
FIG. 1 is a perspective view of a control arrangement in accordance with the present invention.

Referring now to FIG. 1 of the drawing, a control system for a hydrostatically equipped lift truck or the like is disclosed. Only that part of the lift truck and the control system necessary for an understanding of the present invention is specifically illustrated. Examples of hydrostatic transmissions for use in such lift trucks or the like are illustrated, for example, in U.S. Pat. Nos. 3,451,218 issued June 24, 1969 to Grant, and No. 3,486,335 issued Dec. 30, 1969 to Kern et al., both of which are assigned to the assignee hereof and incorporated herein by reference.

The system, as illustrated in FIG. 1, comprises a combined throttle and transmission control including a foot pedal 10 mounted for rocking movement about a shaft 11 and including a link 12 connecting the pedal to a multidirectional input, single-directional output mechanism indicated generally by the numeral 13 for converting and applying the multidirectional movement of the pedal 10 to a unidirectional output at shaft 14 which is connected for controlling a throttle or governor control of the vehicle. This control linkage arrangement is covered in more detail in copending application Ser. No. 760,068, filed Jan. 17, 1977 concurrently herewith and assigned to the assignee hereof.

Transmission control linkage means are also connected to the pedal 10 and include a link 15 connected at one end of the pedal 10 and at the other end to an arm 16 of a shaft 17 having a second arm 18 on the opposite end thereof which is connected by a lost-motion linkage arrangement 19 to an arm 20 which in turn is connected, such as by a shaft 21, to the swash plate control means within the hydrostatic transmission 22. This control linkage connects the pedal 10 to move the control shaft 21 in either forward or reverse directions to thereby move the hydrostatic transmission from its neutral position to either the forward or reverse position. This is normally accomplished simply by moving the swash plate of the pump plate of the pump or motor of the hydrostatic transmission from a neutral or nondisplacement position to a displacement position. Thus, when the pedal 10 is tilted in what would be a forward position, the transmission is shifted into forward drive, and when the pedal 10 is directed to a reverse direction the transmission is likewise shifted to its reverse position.

The degree of shifting of the transmission is coordinated through the linkage means with the degree of movement of the accelerator of the engine of the vehicle to thereby controllably advance the throttle of the engine simultaneously with advancing the displacement of the transmission. When the pedal 10 is returned to its neutral position the throttle control is returned to an idle position and the transmission control is returned to the neutral position. Thus, any time the vehicle throttle is advanced, the vehicle translation system is also advanced so that the vehicle moves over the ground or other supporting surface.

Creeper control means is provided to allow the engine of the vehicle to be revved to a high R.P.M. while the vehicle is traveling at a slow rate of speed or stationary in order to obtain a fast lift of a load or the like. The creeper control essentially overrides the main transmission control and acts to vent or modify the control circuit of the hydrostatic transmission at a control rate to thereby control the rate of travel of the vehicle. The creeper control means comprises a creeper valve control member 23 connected to the creeper valve within the transmission 22 and is slidably mounted for reciprocating movement, as indicated by arrow 24. In this instance, the creeper valve control member 23 is normally biased outwardly and when it is permitted will automatically move outwardly to automatically vent the control circuit of the transmission to disable said transmission. The venting of the control circuit permits the swash plate to return to zero displacement.

Manual operator control means in the form of a foot pedal 25 is mounted for pivotal movement on a shaft 26, which is mounted in suitable brackets 27 and 28 secured to the floorboards or frame of the vehicle. A link member 29 is pivotally connected at one end to the foot pedal and at the opposite end to an arm 30 on a tubular shaft 31 (see FIG. 2) rotatably mounted on a cylindrical shaft 32 and retained thereon in a suitable manner such as by a nut and washer assembly 33. A second arm 34 extends upward from the tubular shaft 31, and includes an aperture or bore 35 therethrough which is adapted to align or register with a similar bore or aperture 36 in a third arm 37 mounted on the cylindrical shaft 32. The arm, as best seen in FIG. 1 and 4, includes a cam portion 38 for engaging the end or creeper valve control member 23 for controlling the position thereof.

The arms 34 and 37 are normally rotatable independently of one another, but are connectable to one another by means of a shaft or plunger 39 which is spring biased toward the connecting position and is withdrawn from the connecting position by suitable means such as a solenoid 40. Solenoid 40 is mounted on a bracket 41 on shaft 31 and is, therefore, carried thereby. Thus, when plunger 39 extends through bores 35 and 36 in the respective arms 34 and 37, the arms are connected to rotate together with the cam portion of arm 37 being operative to control the position of the creeper valve control member 23. This position of the arm 37 and the like is controlled by the foot pedal 25, which is normally biased to its fully raised position by means of a spring or the like 42.

SAFETY CONTROL MEANS

Safety control means, sometimes termed "deadman control" in the industry, comprises, in this instance, means responsive to the minimum weight of an operator position in the seat of the vehicle for controlling the solenoid 40, which in turn controls the connection of the foot pedal 25 to the creeper control valve member 23. The safety control includes a source of power or current such as a battery 43, which is connected by way of a circuit including a conductor 44, a switch 45, a conductor 46, a pressure-responsive or pressure-sensitive switch 47, and a conductor 48 connected to solenoid 40. The solenoid 40 includes a conductor 49 to ground, while at the same time the battery 43 includes a conductor 50 to ground. This completes or comprises the elements of the circuit. When the circuit is completed, such as by closing of switches 45 and 47, the solenoid 40 functions to retract plunger 39 through apertures 35 and 36 connecting arms 34 and 37 for disconnecting control pedal 25 from vent control member 23.

The switch 45 is preferably a manual-type switch, and is preferably the ignition switch of the vehicle so that the circuit is activated only when the ignition switch is in operation. The switch 47 is a pressure-type contact switch wherein pressure biases a pair of contacts apart to break a circuit involving conductors 46 and 48. The switch includes a button or the like 47a, which is depressed by the presence of an operator in the vehicle operator's seat 51. The weight of the operator will bias the seat or a portion thereof downward to engage the plunger 47a and depress it with a consequent forcing of the contacts of the switch apart for breaking the circuit such that the plunger connected to solenoid 40 is spring operated or biased for connecting the two arms 34 and 37. The creeper control linkage assembly is coupled to bias the creeper valve control member 23 into the operative position. Thus, it will be seen that the presence of an operator on seat 51 is essential in order for the vehicle to be put back in operation. In the absence of an operator on the seat 51, the circuit is completed so that solenoid 50 withdrawns plunger 39 to disconnect the two arms 34 and 37 such that the vent control member 23 is automatically biased to its vent position to disable the hydrostatic transmission 22 and thereby prevent translation of the vehicle.

When the plunger 39 is withdrawn from bores 35 and 36, the creeper control pedal 25 will be biased to its fully raised position and the creeper valve control member 23 is biased to its fully extended position. In these positions of these members the bores 35 and 36 are misaligned or out of register, as shown in FIG. 5, so that plunger 39 cannot be extended therethrough for connecting arms 34 and 37. Thus, when an operator raises himself off the seat of the vehicle, the circuit is completed so that the plunger withdraws from bores 35 and 36, uncoupling members 34 and 37 so that the vent or creeper valve control member 23 is automatically biased to its outward position. This causes the swash plate of the hydrostatic transmission to immediately go to zero displacement so that the vehicle is immediately disabled.

In order to reconnect the creeper control pedal 25 to the vehicle control member 23, the pedal 25 must be depressed so that bores 35 and 36 are in alignment as shown in FIG. 4 and the pin 39 extended through bores 35 and 36. In the embodiment of FIGS. 1–5, the operator must sit on the seat and deactuates the switch 47 in order to break the circuit so that solenoid 40 will release the pin 39 to be spring biased into the coupling position. The operator then presses the pedal 25 in order to align pin 39 with bore 36 to couple the shaft 31 to arm 37. The operator releases the pedal 25 by removing his foot, which causes arm 37 to force control member 23 inwardly so that the transmission can again be activated so that the vehicle can be moved. In this manner, the operator has complete control of the creep spool by use of pedal 25.

It will also be appreciated that the above described system can also work in reverse so that the solenoid functions to force pin 39 into the bore. In this instance the circuit would have to be activated with the presence of an operator on the seat. The switch 47 would be of the type that is pressure responsive to complete rather than break the circuit.

Turning now to FIG. 6, an alternate embodiment is illustrated wherein identical elements are identified by the same reference numerals as in the previous embodiments. In this embodiment the pin or plunger 39 is activated by means of a cylinder 75 mounted on the bracket and suitably connected to the plunger 39. As in the previous embodiment the plunger 39 may be spring biased to either the extended (i.e., connecting) or retracted (disconnecting) position and be air activated to the other position. Pressurized fluid, such as air, from a suitable source (not shown) is communicated by conduit means 76 to the cylinder. Preferably, the fluid is controlled such as by a pressure sensitive valve responsive to the pressure of the operator on the seat of the vehicle to control communication of fluid to the cylinder 75.

Turning now to FIG. 7, a further embodiment is shown wherein the extension and retraction of pin or plunger 39 is controlled by a cable 77. The cable 77 is the usual type remote control cable having an outer sleeve 78 connected or anchored to bracket 41 and an inner moveable cable element 79 connected to the plunger 39 at one end and to a remote actuator at the other end. As in the previous embodiments the plunger 39 may be biased by the spring 80 bearing against an annular washer 81 to the extended position as shown or to the retracted position (not shown). Preferably, the cable is connected to an actuator such as a lever or pedal responsive to the weight of the operator on the seat of the vehicle to extend the cable and plunger 39 in the connecting position.

LOCKOUT SYSTEM FOR A SAFETY START

The aforementioned safety system is also tied in with a starter lockout system which is operative to prevent the vehicle from being started when the vent valve is not in its vent position. The starter system for the vehicle includes an electrical starter motor 52 operated by power from battery 43 and includes an ignition starter switch 53 connected by a suitable conductor to the source of power 43 and by a conductor 54 to a lockout switch 55 which in turn is connected by a conductor 56 to a starter control solenoid 57. The starter solenoid 57 is grounded by suitable ground conductor means 58. The switch 55 includes a plunger 59 which normally rides upon the surface of the vent valve control member 23 when the control member is in the non-vent position. In this position the contacts of the switch 55 are open. However, when the control member 23 extends outward to a vent position, the plunger 59 rides down into an annular slot or groove 60 formed in the control member 23. When the plunger 59 drops downward into the slot 60 closing the switch 55, this permits actuation of the starter circuit by starter switch 53. Thus, the inner relationship of these various systems are such that the valve 23 must be in its outward (vented) position in order that the starting circuit can be completed.

BRAKE — CREEPER CONTROL SYSTEM

The aforementioned creeper control system is also interconnected for controlling the brakes of the vehicle. This is such that the vehicle can be slowed if necessary, such as on a steep grade, at the same time that the engine is revved to provide fast lift of a load.

The creeper control pedal 25 is connected by a lost-motion link of a suitable construction, such as a link member 61, having a slot 62 in which a pin 63 on the arm 25a of pedal 25 rides. The opposite end of the link is connected such as by a pin 64 to an arm 65 of a shaft 66 which is mounted in suitable brackets 67. The opposite end of the shaft 66 includes an arm 68 connected by a link 69 to an arm 70 of the vehicle brake pedal 71.

The vehicle brake pedal 71 and arm 70 are connected or mounted in suitable bracket means 72, and includes an arm 73 connected by a link 74 to operate the brakes of the vehicle.

With this arrangement, the creeper pedal 25 is permitted a certain freedom of motion to control the vent valve within the limits of slot 62 before engaging the lower end thereof for engaging the brakes of the vehicle. Preferably, the adjustment thereof is such that the vehicle will essentially be disabled from its translation, in other words, such that transmission 22 is fully disabled prior to engagement of the brakes. This permits the operator to control the engine with the right foot on foot pedal 10 while at the same time stopping the vehicle by means of applying the brakes simultaneously with disabling the transmission 22 thereof such that the vehicle could be operated for lifting operations while standing still. Without this arrangement it would be necessary for the operator to simultaneously depress pedal 25 for creeper control, and at the same time depress brake 71 for brake control either with the same foot or with both feet. If both feet are used, then he would be unable to control the speed of the engine by controlling pedal 10.

From the above description, it is seen that we have provided a novel creeper and deadman control system which is operative to totally disable a vehicle when the vehicle operator is not present, and is selectively interconnected with a creeper control of the vehicle for operator control with the operator on the seat. While we have described our invention by means of a single embodiment, it is to be understood that numerous changes and modifications may be made therein without departing from the spirit and scope of the invention as defined in the appended claims.

The embodiments of the invention in which an exclusive property or privilege is claimed are defined as follows:

1. A control system for a vehicle having in combination an operator station including a seat, and a vehicle transmission control means for controlling the ratio of the transmission, manually operated override control means for selectively overriding the control of said transmission by said transmission control means, the improvement comprising:

disabling means movable between enabling and disabling positions;

a manually operable control member operably connected to said disabling means for selectively controlling the position of said disabling means;

connecting means for connecting said control member to said disabling means and for automatically disconnecting said control member from said disabling means; and pressure responsive means responsive to a predetermined minimum pressure on said vehicle seat to connect said connecting means and responsive to the absence of said predetermined minimum pressure to disconnect said connecting means.

2. The invention of claim 1 wherein said manually operable control member is a foot pedal.

3. The invention of claim 1 wherein said connecting means comprises an electrical circuit, and said pressure responsive means is a pressure responsive switch.

4. The invention of claim 3 wherein said connecting means includes a spring biased solenoid-operated plunger operable by said switch means for establishing a connection between said control member and said disabling means.

5. The invention of claim 1 wherein said disabling means is a creeper valve, biased to a position for disabling said transmission.

6. The invention of claim 5 wherein said connecting means comprises an electrical circuit, and said pressure responsive switch.

7. The invention of claim 6 wherein said connecting means includes a spring biased solenoid-operated plunger operable by said switch means for establishing a connection between said control member and said disabling means.

8. The control system of claim 5 wherein said connecting means comprises a first rotatable member connected to said foot pedal;
a second rotatable member connected to operate said creeper valve and mounted for rotation about a common axis with said first rotatable member; and,
said connecting means comprises a plunger mounted for reciprocating movement on one of said rotatable members and adapted to extend into a bore in the other of said members for connecting said first and second members for rotating together.

9. The control system of claim 8 including spring means normally biasing said plunger toward said bore.

10. The control system of claim 8 wherein said foot pedal and said creeper valve are normally biased to position so that plunger and said bore are normally misaligned so that depression of said foot pedal is required for aligning said plunger with said bore for connecting said first and said second rotatable members.

11. The control system of claim 10 wherein said plunger is controlled by an electrical solenoid and said pressure responsive means is a switch in an electrical circuit that controls said solenoid.

12. The control system of claim 10 including a fluid cylinder for moving said plunger.

13. The control system of claim 10 including a mechanical linkage means for moving said plunger.

14. The control system of claim 13 wherein said mechanical linkage means comprises a spring-biased cable.

* * * * *